United States Patent
Bergenthal

(10) Patent No.: US 12,167,805 B2
(45) Date of Patent: Dec. 17, 2024

(54) COVER FOR ROBOTIC MANNEQUIN

(71) Applicant: EUVEKA (SAS), Saint Marcel les Valence (FR)

(72) Inventor: Audrey Laure Bergenthal, Saint Marcel les Valence (FR)

(73) Assignee: EUVEKA (SAS), Saint Marcel les Valence (FR)

( * ) Notice: Subject to any disclaimer, the term of this patent is extended or adjusted under 35 U.S.C. 154(b) by 133 days.

(21) Appl. No.: 17/539,894

(22) Filed: Dec. 1, 2021

(65) Prior Publication Data
US 2022/0338647 A1 Oct. 27, 2022

(30) Foreign Application Priority Data

Apr. 23, 2021 (FR) ........................................ 2104230

(51) Int. Cl.
*A47F 8/02* (2006.01)
(52) U.S. Cl.
CPC ....................................... *A47F 8/02* (2013.01)
(58) Field of Classification Search
CPC .... A41H 5/00; A41H 5/01; A41H 5/02; A47F 8/00; A47F 8/02
See application file for complete search history.

(56) References Cited

U.S. PATENT DOCUMENTS

| | | | | |
|---|---|---|---|---|
| 5,419,729 | A * | 5/1995 | Gross | A63H 3/06 446/268 |
| 9,498,011 | B2 * | 11/2016 | Chan | A47F 8/00 |
| 11,351,675 | B2 * | 6/2022 | Olivier | B25J 15/0009 |
| 2016/0339349 | A1 | 11/2016 | Hsing et al. | |

FOREIGN PATENT DOCUMENTS

| | | |
|---|---|---|
| EP | 2090619 A1 | 8/2009 |
| JP | 2006141564 A | 6/2006 |

OTHER PUBLICATIONS

French Search Report issued in corresponding French Application No. 2104230, dated Nov. 29, 2021, pp. 1-7, National Institute of Industrial Property, Courbevoie, France.

\* cited by examiner

*Primary Examiner* — F Griffin Hall
(74) *Attorney, Agent, or Firm* — HAUPTMAN HAM, LLP

(57) ABSTRACT

One or more embodiments relate to a liner cover for a robotic mannequin able to reproduce on demand at least one portion of the morphology of an individual by controlling a plurality of shells that are movable with respect to a frame of the robotic mannequin, the cover including a stack of layers, the stack of layers including an inner layer with an elastomer base, an outer layer including at least one textile, disposed around the inner layer, and applying at least one mechanical constraint on at least one portion of the inner layer, at least one element for reducing the transmission of mechanical constraints between the inner layer and the outer layer.

13 Claims, 3 Drawing Sheets

COUPE F-F

COVER FOR ROBOTIC MANNEQUIN

TECHNICAL FIELD

The invention relates to the field of robotic mannequins that have for particularly advantageous application the field of sewing and clothes making.

PRIOR ART

For several years now, robotic mannequins have come to light. These mannequins are intended for the textile industry and are configured in such a way as to have in part at least one adaptable morphology.

Note for example mannequins of which certain parts are more or less inflatable so as to more or less enlarge the mannequin and thus have several morphologies on the same mannequin.

These robotic mannequins thus make it possible to reproduce at least partially certain measurements of an individual with more or less precision. This is made possible by the movable parts.

However, one of the main disadvantages with these technologies resides in the discontinuity of the deformations of the mannequins, indeed, these discontinuities in the form of the mannequin result in substantial problems during the making of clothes.

An object of the present invention is therefore to propose a solution to these problems.

The other objects, characteristics and advantages of the present invention shall appear when examining the following description and accompanying drawings. It is understood that other advantages can be incorporated.

SUMMARY

A first aspect relates to a liner cover, for robotic mannequin able to reproduce on demand at least one portion of the morphology of an individual by controlling a plurality of shells that are movable with respect to a frame of the robotic mannequin, the cover being characterised in that it comprises a stack of layers, said stack of layers comprising:
- an inner layer with an elastomer base;
- an outer layer comprising at least one textile, disposed around the inner layer, and applying at least one mechanical constraint on at least one portion of the inner layer;
- and wherein the cover comprises at least one element for reducing the transmission of mechanical constraints between the inner layer and the outer layer.

The displacement of the shells generally results, in the case of a robotic mannequin of the prior art, in topographical irregularities at bords of the shells; indeed when a shell is displaced towards the front, this creates a break between the surface of said shell and the surface surrounding the shell.

The present invention solves this problem by disposing a cover over the frame, and therefore the shells, of the robotic mannequin.

This cover, through its design, makes it possible to hug the movements of the shells while still harmonising the surface topography of the robotic mannequin.

Using a clever stack of layers allows for this.

In addition, recourse to at least two layers of different physical-chemical natures requires the use of ingenuity in order to reduce the friction coefficient between said two layers.

The present invention thus allows for a deformation of the cover according to the frame of the robotic mannequin while still retaining a curved and non-abrupt surface topography.

By limiting the mechanical constraints on the inner layer, i.e. by limiting friction, the movements of the shells are less disturbed by the interfacial resistances between the two layers, inner and outer, thanks to reduced friction. Indeed, when the shells are displaced, they deform the inner layer which is already constrained by the outer layer; it follows that the outer surface of the inner layer (and the inner surface of the outer layer) are the location of friction. The latter are all the more so substantial as the inner layer, with an elastomer base, is of a strongly adherent nature and that the outer layer strongly taught around it so that the outer surface of the mannequin is regular and smooth.

The present invention thus allows a robotic mannequin to have a surface topography that is close, even identical, to the surface topography of a human being. Indeed, the present invention makes it possible reduce, even prevent, the presence of topographical irregularities on the surface for example of the torso.

Another aspect relates to a method for installing a cover on a robotic mannequin able to reproduce on demand the morphology of an individual by controlling a plurality of shells that are movable with respect to at least one frame, said method comprising the following steps:
- disposing the inner layer comprising an elastomer above the frame of the robotic mannequin;
- disposing the outer layer comprising at least one textile above the inner layer and in such a way as to apply at least one mechanical constraint in compression on at least a portion of the inner layer.

Another aspect relates to a robotic mannequin able to reproduce on demand at least one portion of the morphology of an individual by controlling a plurality of shells that are movable with respect to a frame of the robotic mannequin, and comprising a liner cover applied on the plurality of shells, the outer layer applying at least one mechanical constraint on the inner layer when the inner layer is disposed between said frame and the outer layer.

BRIEF DESCRIPTION OF THE DRAWINGS

The purposes and objects as well as the characteristics and advantages of the invention shall appear better in the detailed description of an embodiment of the latter which is shown by the following accompanying drawings wherein.

Figure 1:
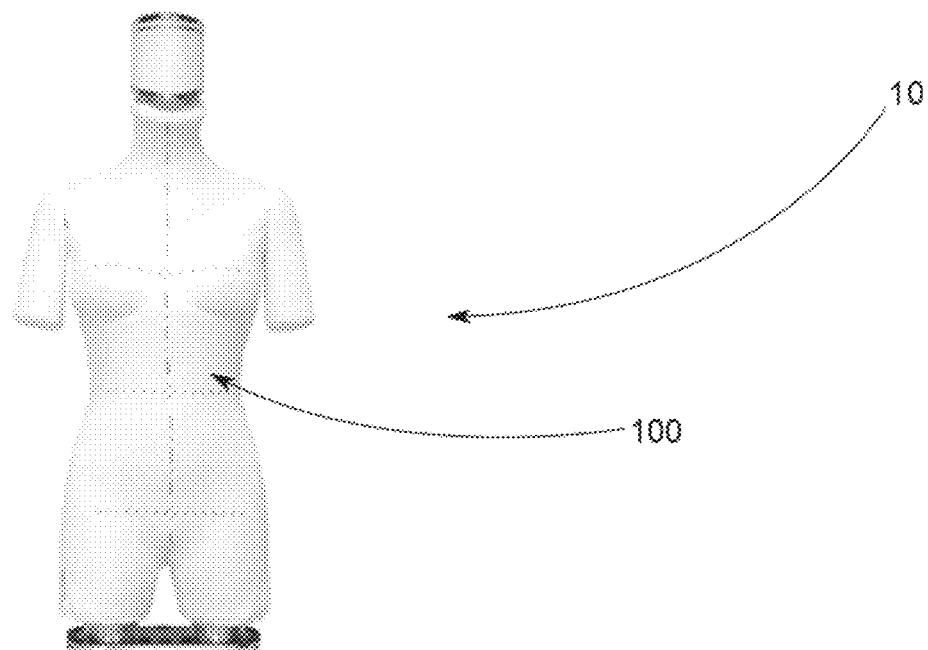
FIG. 1 shows a robotic mannequin covered with a cover according to an embodiment of the present invention.

The drawings are given by way of examples and do not limit the invention. They form schematic block representations intended for facilitating the understanding of the invention and are not necessarily to the scale of the practical applications.

DETAILED DESCRIPTION

Before beginning a detailed review of embodiments of the invention, optional characteristics are mentioned hereinafter that can possibly be used in association or alternatively.

the element 140 for reducing the transmission of mechanical constraints is at least partially formed by a portion comprising a lubricant 141, said portion being comprised in said inner layer 120 and/or said outer layer 130;

Thus the presence of this lubricant 141 in the outer layer 130 results in that the inner surface 132 of the outer layer 130 has a friction coefficient with the outer surface 123 of the inner layer 120 that is low in relation to the case where they would not be any lubricant 141 in the outer layer 130.

This makes it possible to reduce the friction coefficient between the inner layer and the outer layer;

said lubricant 141 is disposed in the volume of the inner layer 120 and/or of the outer layer 130;

"Disposed in the volume" means that this lubricant is a component of the layer concerned. The lubricant reduces the sticky effect of the layer, especially when it is the layer made of elastomer, which still retaining its elasticity.

The inner layer has a silicone base;

This makes it possible to have an inner layer allowing for a conformation in accordance with the movements of the shells while still adapting the topography of the frame so as to reduce the irregularities thereof.

The lubricant 141 is a silicone additive;

the ratio between the thickness 121 of the inner layer 120 and the thickness 131 of the outer layer 130 is comprised between 0.9 and 1.1, the thicknesses 121, 131 being taken in a direction orthogonal to the inner surface 122, 132 of the layer 120, 130 considered at the measuring point considered;

This makes it possible to have a deformation behaviour that is similar for the two layers, with good protection against the piercing by the needles, a softness or a certain soft feel, without risk of musculoskeletal disorders.

The thickness 121 of the inner layer 120 is comprised between 3 and 7 mm, and is preferably equal to 5 mm;

This makes it possible to hug the desired shape by the displacement of the shells while still reducing the existing topographical irregularities between the different portions that are movable or not of the frame.

The ratio between the interior transverse dimension of the outer layer 130 at rest and the exterior transverse dimension of the inner layer 120 is strictly less than 1;

the element 140 for reducing the transmission of mechanical constraints comprises at least one intermediate layer 142 the inner surface of which has a friction coefficient less than that of the outer surface 123 of the inner layer 120, and preferably that comprises at least one lubricating element taken from: Teflon, a varnish, a primer;

the inner layer 120 and the outer layer 130 are physically dissociated;

This allows the outer layer to slide freely, and to have several degrees of freedom in the choice of materials for the inner layer as well as for the outer layer.

This also makes it possible to combine several materials and thus benefit for their cumulated physical-chemical properties. This makes it possible to have an inner layer made of elastomer and an outer layer made of textile.

The textile comprises: a flexible 3D textile with an additive in the form of a treatment via the adding of a primer;

This makes it possible to prick needles in the textile during the making of pieces of clothing.

This makes it possible to have a wide choice of textures for the outer face of the outer layer. This textile can be configured to have anti-friction properties with regards to clothing or anti-electrostatics, or it prevents premature wear of this layer.

a pressure sensor is configured to measure the pressure exerted by the outer layer 130 on the inner layer 120.

According to a possibility, the robotic mannequin 10 is able to reproduce on demand at least one portion of the morphology of an individual by controlling a plurality of shells 11 that are movable with respect to a frame of the robotic mannequin 10, and it comprises a liner cover 100 applied on the plurality of shells, the outer layer 130 applying at least one mechanical constraint on the inner layer 120 when the inner layer 120 is disposed between said frame 11 and the outer layer 130.

In this way, the outer layer 130 is shaped to undergo a mechanical constraint in tension when it is disposed on said robotic mannequin 10. The extending of the perimeter of the outer layer can range up to 50%.

Actuators are configured to displace the shells of the plurality of shells, the thrust force of the actuators being at least 150 N, and preferably 200 N.

This makes it possible to ensure the deformation of the skin and the cover. A thrust that is too weak results in a shimming of the actuators, a thrust that is too strong can damage the clothing.

This allows the cover to be disposed as close as possible to the frame in such a way as to reproduce with precision the morphology sought according to the movement of the shells. This also makes it possible to not have folds on the surface of the robotic mannequin The present invention relates to a cover that can be of a single piece or that comprises a plurality of liners. Indeed, the cover according to the present invention comprises a stack of layers. According to an embodiment, the layers of the stack of layers can have zones of attaching with one another. For example, this can be a seam on an upper edge of the cover that makes it possible to attach all the layers of the stack of layers while still retaining a freedom of movement at faces of at least two layers of the stack of layers.

According to a preferred embodiment, at least one portion of the layers of the stack of layers are physically independent from one another.

Thus, according to an embodiment such as described in what follows, the stack of layers comprises at least one outer layer and an inner layer as well as an interface between said outer and inner layers.

Advantageously, at least one of the layers of the stack, and preferably all the layers, have the form of a continuous envelope from bottom to top, and only provided with two openings, respectively a lower opening and an upper opening. The positioning on the frame of the mannequin is carried out by pulling on the layer in question.

Thus according to this embodiment, the cover comprises an inner layer, also called the first layer, preferably comprising an elastomer, configured to cover the frame of the robotic mannequin. The layer can have an elastomer base. The term "with a base" of a material M means a layer comprising only this material M or mostly this material M and optionally other materials.

Then once this inner layer is in place, the outer layer can be disposed on top, but not necessarily in contact with, the inner layer. This outer layer advantageously comprises a textile configured to cover the inner layer and therefore the robotic mannequin. The positioning of the outer layer and of the inner layer on the frame of the robotic mannequin gives rise to an outer layer/inner layer interface.

According to an embodiment, an intermediate layer can be disposed between the inner layer and the outer layer, before and/or after the positioning of the outer layer. This intermediate layer in part forms at least the outer layer/inner layer interface.

Advantageously and such as described in what follows, this intermediate layer can be configured to reduce the mechanical constraints applied by the outer layer to the inner layer and/or inversely. Note that these mechanical constraints have a vector of which one of the main components is located in the plane of the surfaces of the inner and outer layers.

Indeed, when the frame of the robotic mannequin is deformed, this results in the deformation of the cover, and this of the stack of layers. In order to reduce the mechanical constraints between the outer and inner layers, the interface is advantageously an interface for reducing the transmission of the mechanical constraints. For example this interface can comprise an intermediate layer comprising a lubricating element, and/or comprise a lubricant. Thus the interface for reducing the transmission of mechanical constraints can comprise a varnish, or a layer of Teflon, or any type of elements or lubricant that makes it possible to reduce the friction coefficient between the inner layer and the outer layer. According to an embodiment, these elements or lubricants can be integrated at least partially in the inner layer and/or the outer layer.

Indeed, it can be a layer deposited on the outer surface of the inner layer facing the inner surface of the outer layer, and/or on the inner surface of the outer layer.

It can also be a lubricant disposed directly in the inner layer and/or the outer layer allowing for the formation of an interface for reducing the transmission of mechanical constraints with the other layer.

The present invention shall now be described through FIGS. 1 to 7.

FIG. 1 shows, according to an embodiment, a robotic mannequin 10 comprising a cover 100 according to the present invention. According to this figure, the cover 100 is shaped to cover the frame 11 of the robotic mannequin 10 in such a way as to define the surfaces of the torso, and preferably arms and preferably the upper thighs.

The term "robotic mannequin" means a device for reproducing the morphology of a human being, on at least one anatomical portion. In particular, this can be a torso portion, from the hips, to the neck. This case is not limiting, the mannequin able to alternatively or as a supplement correspond to other parts of the body, in particular at least one lower limb and/or at least one upper limb. The adjective "robotic" means the presence, in the mannequin, of movable parts that can be controlled by means of control, typically computerised means generating digital controls that are then transmitted and transformed into control signals of electromechanical elements.

Figure 2:
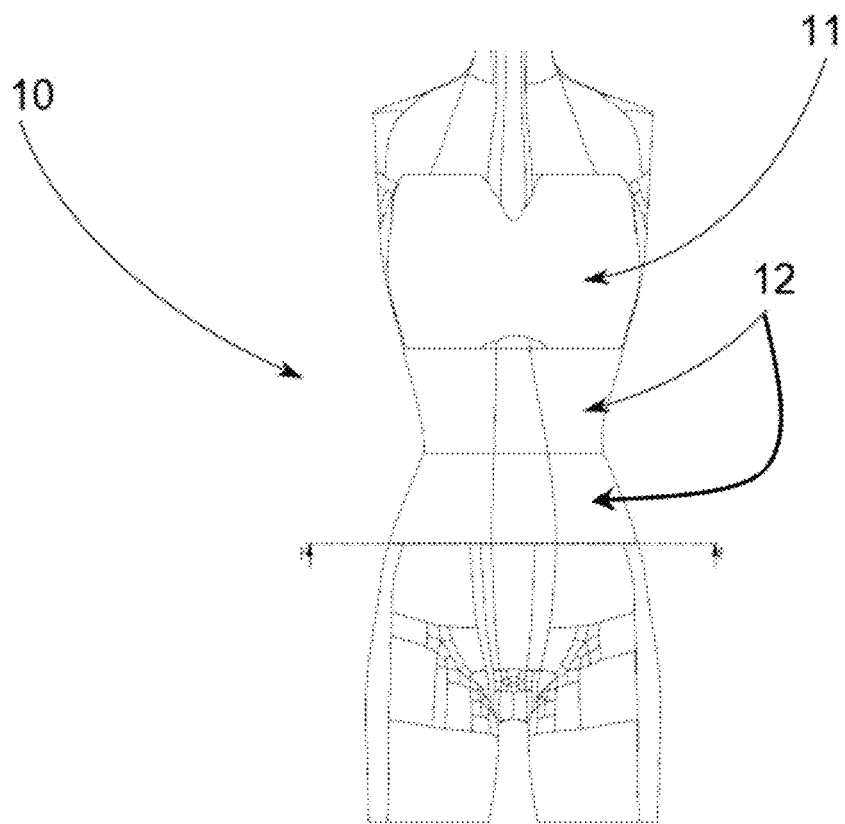
FIG. 2 shows a schematic view of a robotic mannequin.

FIG. 2 shows a schematic view of a portion of the frame 11 of a robotic mannequin 10. This frame 11 comprises a plurality of shells 12 that are movable relatively to said frame 11 in such a way as to be able to adapt the morphology, at least partially, of the robotic mannequin 10 according to the needs of the user.

In the absence of a cover 100 according to the present invention, the displacement of these shells 12 could result in reliefs at the edge of the shell 12 that are incompatible with a human morphology. These reliefs would comprise in particular breaks or abrupt hollows. These reliefs would form topographical irregularities and would negative effect the harmony of the surface of the robotic mannequin 10. The use of a cover 100 according to the present invention reduces, even entirely prevents, the presence of this type of disadvantage. Indeed, using a cover 100 according to the present invention makes it possible to uniformiser the surface of the robotic mannequin 10.

Figure 3:
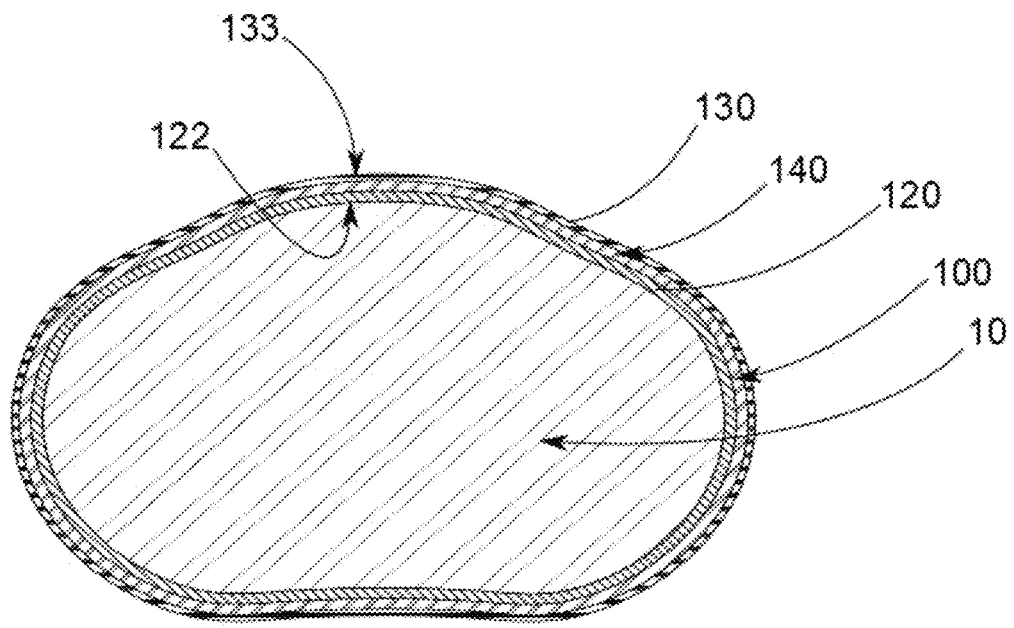
FIG. 3 shows a cross-section view of a mannequin covered with a cover according to an embodiment of the present invention.

FIG. 3 shows a cross-section view at the belt of a robotic mannequin 10 comprising a cover 100 according to an embodiment of the present invention.

According to the embodiment shown in FIG. 3, the stack of layers 110 comprises the inner layer 120, an intermediate layer 142 for reducing the transmission of mechanical constraints and the outer layer 130.

Advantageously, the intermediate layer 142 for reducing the transmission of mechanical constraints is configured to reduce the friction coefficient that would exist between the inner layer 120 and the outer layer 130 in the absence of said intermediate layer 142 or of a lubricant 141.

Note that advantageously, the stack of layers 110 smooths the shapes produced by the shells 12 of the frame 11 of the robotic mannequin 10. In particular, the cover 100 makes it possible through the choice of materials and of their respective thicknesses to reduce, even prevent, the formation of abrupt asperities at the surface of the robotic mannequin 10. These abrupt asperities are part of a plurality of topographical irregularities that can be observed on robotic mannequins in the absence of a cover according to the present invention According to an embodiment, the outer layer 130 comprises a textile. This can be a knitting carried out at least partially from fibres of polymer material, in particular elastomers (for example at least 15% by mass of elastomer fibres). In terms of material, mention can be made of: polyamide, polyester, metal fibres, elastomers such as elastane. For example, the outer layer can be formed by a knitting comprising a combination of fibres: made of elastomer (for example elastane at 17% by mass), polyamide (for example 51% by mass), polyester (for example 32% by mass).

Preferably, the elongation up to the elastic limit of the outer layer 130 is greater than 100%, even more than 200%.

In an ingenious way, the fact that the outer layer 130 comprises a textile that allows the user to prick the cover 100 with a needle for example, to dispose therein pieces of clothing for example.

Advantageously, the thickness 131 of the outer layer 130 is comprised between 2 and 8 mm, preferably between 3 and 7 mm and advantageously equal to 5 mm.

According to an embodiment, the spatial dimensions of the outer layer 130 are greater when the outer layer 130 is not disposed on the inner layer 120, i.e. when it is at rest, to those when the outer layer is disposed on the inner layer 120. The outer layer is thus taut.

According to an embodiment, the inner layer 120 comprises an elastomer, more preferably silicone. Optionally, this can be a polymer material having an elongation ratio at the elastic limit of at least 500%, even 800%. Preferably, the material has good resistance to fatigue, with a limited shape memory, for example resistant to at least 45,000 cycles; preferably, the elastomer material has a reduced hardness, in such a way as to flexible accommodate the variations in the position of the shells, for example in order to prevent phenomena of surface discontinuity at zones between the shells.

The hardness of the elastomer material is more preferably less than or equal to 50 Shore 00; it can be for example of a Shore hardness 00 of 40.

Preferably, by using a lubricant in the silicone material, the friction coefficient between the layer 120 and the layer 130 is less than what would exist between a layer 120 made of silicone only, and the layer 130. The lubricant can be added in the composition not yet hardened; this can be an additive of the type sold under the brand "soft touch" by the company COP at Saint Nazaire en Royans and be for example present for 1% by mass of the mixture. Moreover, the additive can comprise polyurethane and/or polyester, for example in the form of a dispersion in the silicon resin, and/or water-emulsifiable polyisocyanates.

Preferably, the thickness 121 of the inner layer 120 is comprised between 2 and 8 mm, preferably between 3 and 7 mm and advantageously equal to 5 mm. It is not absolutely necessary that the entire thickness 121 be carried out with an elastomer, in particular silicone, comprising an additive that favours sliding; a superficial portion of this thickness can suffice for this purpose.

According to an additional possibility or alternative, a varnish is carried out on the surface of the outer layer, for the purpose of reducing the friction coefficient.

In an ingenious way, the thickness 121 of the inner layer 120 makes it possible to have on the inner layer 120, in the inner layer 120 and/or under the inner layer 120, one or more sensors of diverse natures in such a way as to collect data, these sensors will be described in what follows.

The clever choice of this thickness 121 makes it possible on the one hand to habituate the variations in height between diverse movable shells in such a way as to retain a harmonious topography and on the other hand to have the liberty of having diverse other members inside the inner layer 120 itself, such as for example sensors.

According to a preferred embodiment, the thickness 121 of the inner layer 120 and the thickness 131 of the outer layer 130 are identical, optionally to the nearest 10%. This makes it possible to have similar behaviours during deformations.

According to an embodiment, the outer layer 130 applies a mechanical constraint in compression on the inner layer 120 when the outer layer 130 and the inner layer 120 cover the frame 11 of the robotic mannequin 10.

Particularly advantageously, the outer layer 130 is disposed above the inner layer 120 in such a way as to apply a mechanical constraint in compression on the inner layer 120. For this, several methods are possible.

By way of a non-limiting example, the outer layer 130 can include a textile or an elastic element in such a way that the extension dimensions of the outer layer 130 are smaller than the extension dimensions of the frame 11 of the robotic mannequin 10 covered with the inner layer 120. Thus, when the outer layer 130 is disposed in such a way as to cover the inner layer 120, the outer layer 130 undergoes a mechanical constraint in tension and the inner layer 120 undergoes a mechanical constraint in compression.

By way of a non-limiting example, the outer layer 130 can include a tightening mechanism in such a way as to reduce the extension dimensions of the outer layer 130, once the latter is disposed above the inner layer 120.

Preferably, the outer layer 130 has an elongation capacity within the elastic limit thereof of at least 50%.

Such as indicated hereinabove, a first option is that the element for reducing the transmission of mechanical constraints between the inner layer 120 and the outer layer 130 is carried out by a lubricant in the material of one of these layers, and particularly the inner layer 120.

As a supplement or alternatively, the element for reducing the transmission of mechanical constraints can be carried out by a physical interface inserted between the layer 120 and the layer 130. In this case, an intermediate layer 142 is used of which the properties make it possible to have less friction between the intermediate layer 142 and each one of the layers 120 and 130, relatively to the situation that would exit without the intermediate layer, with a direct friction between the layer 120 and the layer 130. Preferably, the thickness of the intermediate layer 142 is less than the thickness of the layer 120 and of the layer 130.

Figure 4:
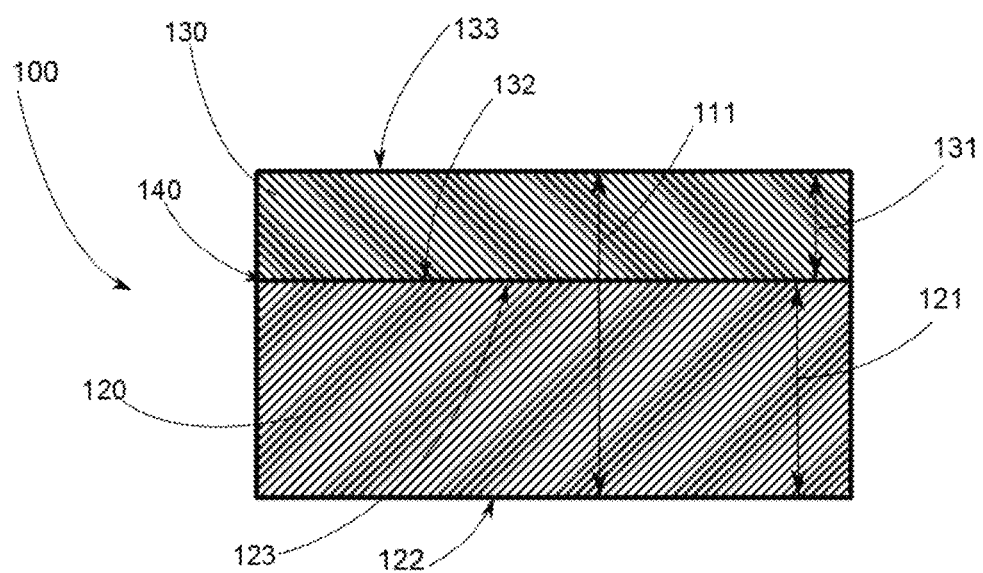
FIG. 4 shows a stack of layers formant a cover according to an embodiment of the present invention.

FIG. 4 shows a stack of layers 110 according to an embodiment of the present invention. In this figure, the interface 140 for reducing the transmission of mechanical constraints can have been subjected to any treatment aiming to reduce the friction coefficient between the outer surface 123 of the inner layer 120 and the inner surface 132 of the outer layer 130. This reduction in the friction coefficient allows the inner layer 120 to be displaced locally according to the movable shells 12 of the frame 11 and to deform the outer layer 130 according to said displacements of shells 12.

In this figure, and according to an embodiment, the thickness 131 of the outer layer 130 is less than the thickness 121 of the inner layer 120.

Figure 5:
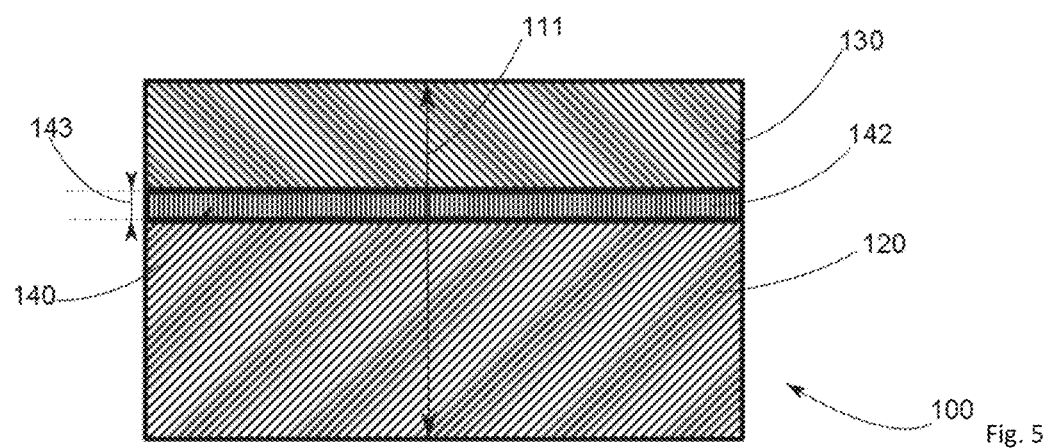
FIG. 5 shows a stack of layers formant a cover according to another embodiment of the present invention.

According to an embodiment, the thickness 111 of the stack of layers 110 is comprised between 8 and 12 mm, preferably between 9 and 11 mm and advantageously 10 mm FIG. 5 shows an embodiment wherein the interface 140 for reducing the transmission of mechanical constraints comprises an intermediate layer 142 disposed between the inner layer 120 and the outer layer 130.

This intermediate layer 142 is configured to reduce the friction coefficient, also called friction, between the outer surface 123 of the inner layer 120 and the inner surface 132 of the outer layer 130.

Figure 6:
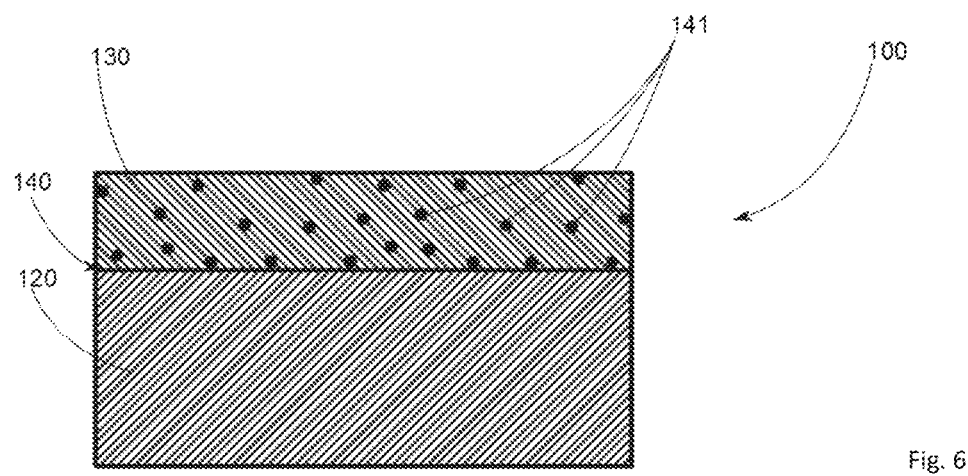
FIG. 6 shows a stack of layers formant a cover according to another embodiment of the present invention.

FIG. 6 shows an embodiment according to the present invention wherein the outer layer 130 comprises a lubricant 141. Thus the presence of this lubricant 141 in the outer layer 130 results in that the inner surface 132 of the outer layer 130 has a low friction coefficient with the outer surface 123 of the inner layer 120 with respect to the case where there would be no lubricant 141 in the outer layer 130.

Thus, the presence of a lubricant 141 in the outer layer 130 results in a modification of the surface condition of the surfaces 132, 133 of the outer layer 130 in such a way that the friction coefficient with the outer surface 123 of the inner layer 120 is reduced relatively to the case exempt of lubricant 141. According to another possibility, the inner surface of the outer layer has a liner that increases the sliding, for example with a primer layer.

Figure 7:
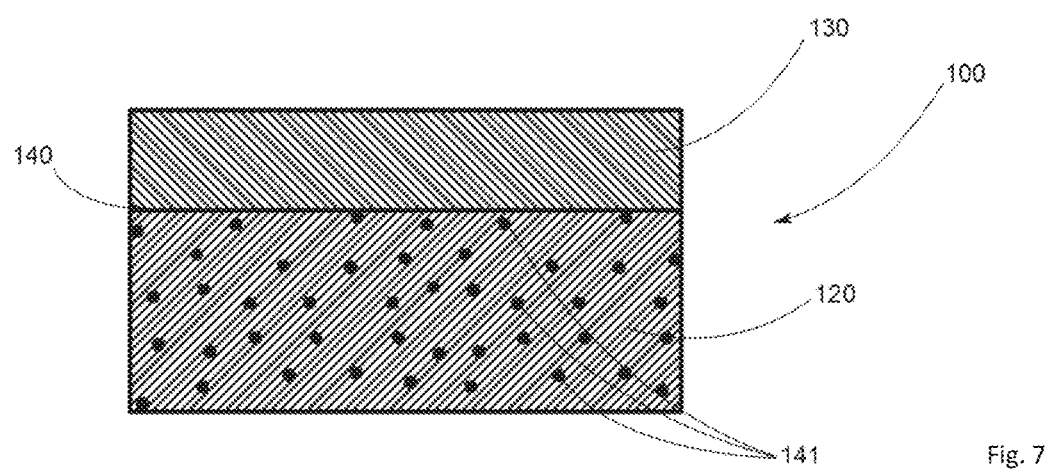
FIG. 7 shows a stack of layers formant a cover according to another embodiment of the present invention.

FIG. 7 shows the inverse case, i.e. an embodiment wherein it is the inner layer 120 that comprises a lubricant 141.

The lubricant can be in the form of an additive incorporated into the silicone material, as indicated hereinabove.

An embodiment not shown also consists in that the inner layer 120 and the outer layer 130 each comprise a lubricant 141 of the same physical-chemical nature or not.

Generally, the present invention consists of a cover 100 comprising at least one outer layer 130 and an inner layer 120 having a low friction coefficient in relation to one another, either through the nature itself of their respective materials comprising or not a lubricant or lubricants 141 thus forming an interface 140 for reducing the transmission of mechanical constraints, or by adding an intermediate layer 142 disposed between the inner layer 120 and the outer layer 130 in such a way as to reduce the mechanical constraints, these mechanical constraints concern the constraints that the outer layer 130 apply on the inner layer 120 and the constraints that the inner layer 120 apply on the outer layer 130.

According to an embodiment, one or more sensors can be disposed on or in the cover 100, preferably between the outer surface 123 of the inner layer 120 and the inner surface 132 of the outer layer 130, in such a way as to measure one or more physical parameters. Preferably, this can be for the least pressure sensors that make it possible to evaluate the pressure exerted on the cover, and more particularly between the outer layer 130 and the inner layer 120.

For example, a force sensor or a strain gauge can be disposed in the cover 100 in such a way as to measure in real time the mechanical constraints applied by a layer on another and/or by the frame 11 on a piece of clothing through the cover 100.

Advantageously, the present cover 100 makes it possible to house at diverse levels of the latter one or more sensors of diverse types.

Thus the present invention makes it possible to reduce the abrupt surface deformations present. The present invention makes it possible to adjust the surface topography so that it approaches as much as possible a human morphology with few or even no topographical irregularities. Using a cover according to the present invention provides a more human appearance for the surface of the robotic mannequin, allowing the user to design clothing easily.

The present invention also relates to a method for installing a cover according to the present invention on said robotic mannequin.

In particular the present invention makes it possible to reduce the mechanical constraints supported by the various elements of the transmission chain of the mechanical forces. Indeed, this mechanical chain, comprising among other things a motor, mechanical transmission elements, at least one shell then a portion of the inner layer and a portion of the outer layer, has to support very substantial constraints when the friction coefficient between the inner layer and the outer layer is not reduced such as presented in the present invention.

Note in particular that in the absence of an element for reducing the transmission of mechanical constraints, the motor and all the transmission parts would be subjected to strong constraints is a sustained regime for the displacement of a shell face with the existing friction between the outer layer and the inner layer.

The clever use of this element for reducing the transmission of mechanical constraints makes it possible to work with motor elements of a lower power, lighter mechanical parts, less expensive and polymer shells for example made of carbon in an organic matrix.

Indeed, the element for reducing the transmission of mechanical constraints makes it possible to reduce, even prevent, the damage that the parts of this mechanical constraint transmission chain can be subjected to.

According to an embodiment, this method comprises at least the following steps:
disposing of the inner layer above the frame of the robotic mannequin;
disposing of the outer layer above the inner layer, the outer layer being disposed in such a way as to apply a mechanical constraint in compression on a portion of the inner layer.

This thus makes it possible to mould as close as possible the frame of the robotic mannequin and thus reproduce the desired morphology while still reducing and even preventing the topographical irregularities between the shells.

The invention is not limited to the embodiments described hereinabove and extends to all the embodiments covered by the claims.

LIST OF REFERENCES

10 Robotic mannequin
11 Shells
100 Cover
110 Stack of layers
111 Thickness of the stack of layers
120 Inner layer
121 Thickness of the inner layer
122 Inner surface of the inner layer
123 Outer surface of the inner layer
130 Outer layer
131 Thickness of the outer layer
132 Inner surface of the outer layer
133 Outer surface of the outer layer
140 Interface for reducing the transmission of mechanical constraints
141 Lubricant
142 Intermediate layer
143 Thickness of the intermediate layer

The invention claimed is:

1. A robotic mannequin able to reproduce on demand at least one portion of a morphology of an individual by controlling a plurality of shells that are movable with respect to a frame of the robotic mannequin, and comprising a cover simultaneously applied on the plurality of shells, an outer layer applying at least one mechanical constraint on an inner layer when the inner layer is disposed between said frame and the outer layer, and
   wherein the cover comprises a stack of layers, said stack of layers comprising:
   the inner layer with an elastomer base;
   the outer layer comprising at least one textile, disposed around the inner layer, and applying at least one mechanical constraint on at least one portion of the inner layer;
   and wherein the cover comprises at least one element for reducing transmission of mechanical constraints between the inner layer and the outer layer, and
   wherein the element for reducing transmission of mechanical constraints is at least partially formed by a portion comprising a lubricant, said portion being comprised in said inner layer and/or said outer layer.

2. The robotic mannequin according to claim 1, wherein the element for reducing transmission of mechanical constraints is at least partially formed by a portion comprising a lubricant, said portion being comprised in said inner layer and/or said outer layer, and wherein said lubricant is disposed in a volume of the inner layer and/or of the outer layer.

3. The robotic mannequin according to claim 2, wherein the inner layer has a silicone base.

4. The robotic mannequin according to claim 3, wherein the lubricant is a silicone additive.

5. The robotic mannequin according to claim 1, wherein a ratio between a thickness of the inner layer and a thickness of the outer layer is comprised between 0.9 and 1.1, the thicknesses being taken in a direction orthogonal to an inner surface of the layer considered at a measuring point considered.

6. The robotic mannequin according to claim 1, wherein a thickness of the inner layer is comprised between 3 and 7 mm, and is preferably equal to 5 mm.

7. The robotic mannequin according to claim 1, wherein a ratio between an interior transverse dimension of the outer layer at rest and an exterior transverse dimension of the inner layer is less than 1.

8. The robotic mannequin according to claim 1, wherein the element for reducing transmission of mechanical constraints comprises at least one intermediate layer, the inner surface of which has a friction coefficient less than that of the outer surface of the inner layer, and that comprises at least one lubricating element taken from: polytetrafluoroethylene, a varnish, a primer.

9. The robotic mannequin according to claim 1, wherein the outer layer is slidable around the inner layer.

10. The robotic mannequin according to claim 1, wherein the textile comprises elastomer fibres.

11. The robotic mannequin according to claim 1, comprising at least one pressure sensor configured to measure a pressure exerted by the outer layer on the inner layer.

12. The robotic mannequin according to claim 1, comprising actuators configured to displace the shells of the plurality of shells, the thrust force of the actuators being at least 150 N, and preferably 200 N.

13. A robotic mannequin able to reproduce on demand at least one portion of a morphology of an individual by controlling a plurality of shells that are movable with respect to a frame of the robotic mannequin, and comprising a cover simultaneously applied on the plurality of shells, an outer layer applying at least one mechanical constraint on an inner layer when the inner layer is disposed between said frame and the outer layer, and
wherein the cover comprises a stack of layers, said stack of layers comprising:
the inner layer with an elastomer base;
the outer layer comprising at least one textile, disposed around the inner layer, and applying at least one mechanical constraint on at least one portion of the inner layer;
and wherein the cover comprises at least one element for reducing transmission of mechanical constraints between the inner layer and the outer layer, and
wherein the element for reducing transmission of mechanical constraints is at least partially formed by a portion comprising a lubricant, said portion being comprised in said inner layer and/or said outer layer, and/or comprises at least one intermediate layer, and an inner surface of which has a friction coefficient less than that of the outer surface of the inner layer.

* * * * *